United States Patent

Sakurai et al.

[11] Patent Number: 5,959,754
[45] Date of Patent: Sep. 28, 1999

[54] OPTICAL WIRELESS COMMUNICATION SYSTEM

[75] Inventors: Yoshitaka Sakurai, Zama; Kazutoshi Hirohashi, Yokohama; Kazuo Ichihara, Sagamihara; Takaaki Takeda, Tokyo; Takeshi Nomoto, Yokohama, all of Japan

[73] Assignees: Victor Company of Japan, Ltd., Yokohama; NTT Data Comm. Sys., Tokyo, both of Japan

[21] Appl. No.: 08/781,678

[22] Filed: Jan. 10, 1997

[51] Int. Cl.⁶ .............................. H04B 10/10; H04J 14/08
[52] U.S. Cl. .................. 359/172; 340/825.08; 359/136; 359/137; 359/159; 370/346
[58] Field of Search ..................... 359/172, 136, 359/137, 111, 159; 370/346, 328; 340/825.08, 825.48

[56] References Cited

U.S. PATENT DOCUMENTS

| | | |
|---|---|---|
| 4,402,090 | 8/1983 | Gfeller et al. ......................... 359/172 |
| 4,456,793 | 6/1984 | Baker et al. ............................ 359/172 |
| 5,297,144 | 3/1994 | Gilbert et al. ......................... 359/118 |
| 5,373,503 | 12/1994 | Chen ...................................... 370/346 |
| 5,461,627 | 10/1995 | Rypinski ................................ 370/346 |
| 5,485,463 | 1/1996 | Godoroja ............................... 370/346 |
| 5,737,330 | 4/1998 | Fulthorp et al. ....................... 370/346 |
| 5,754,946 | 5/1998 | Cameron et al. .................. 340/825.44 |

*Primary Examiner*—Leslie Pascal
*Attorney, Agent, or Firm*—Michael N. Meller

[57] ABSTRACT

Interference between adjacent sections is prevented in an optical wireless communication system, in which a center device is capable of concurrently communicating through lines with a plurality of parent devices each disposed in one of the sections into which a communication area of the system is divided and each of the parent devices communicates with a plurality of child devices disposed in the same section where said parent device is disposed. The sections is grouped into some groups of sections which do not adjoin each other. Optical wireless communications are done only within one group of sections in each communication period. Some techniques for improving the effect of communication are disclosed.

13 Claims, 8 Drawing Sheets

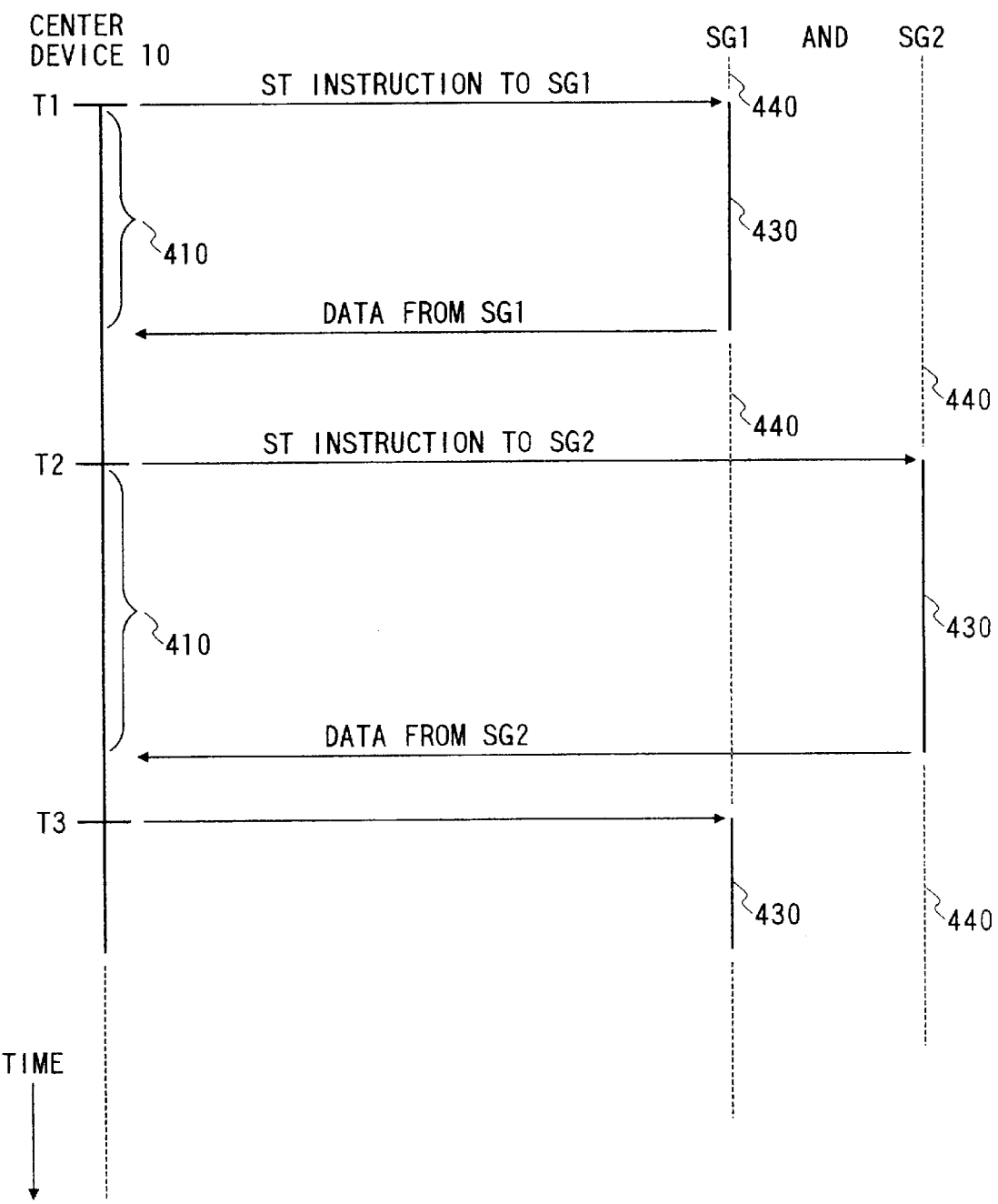

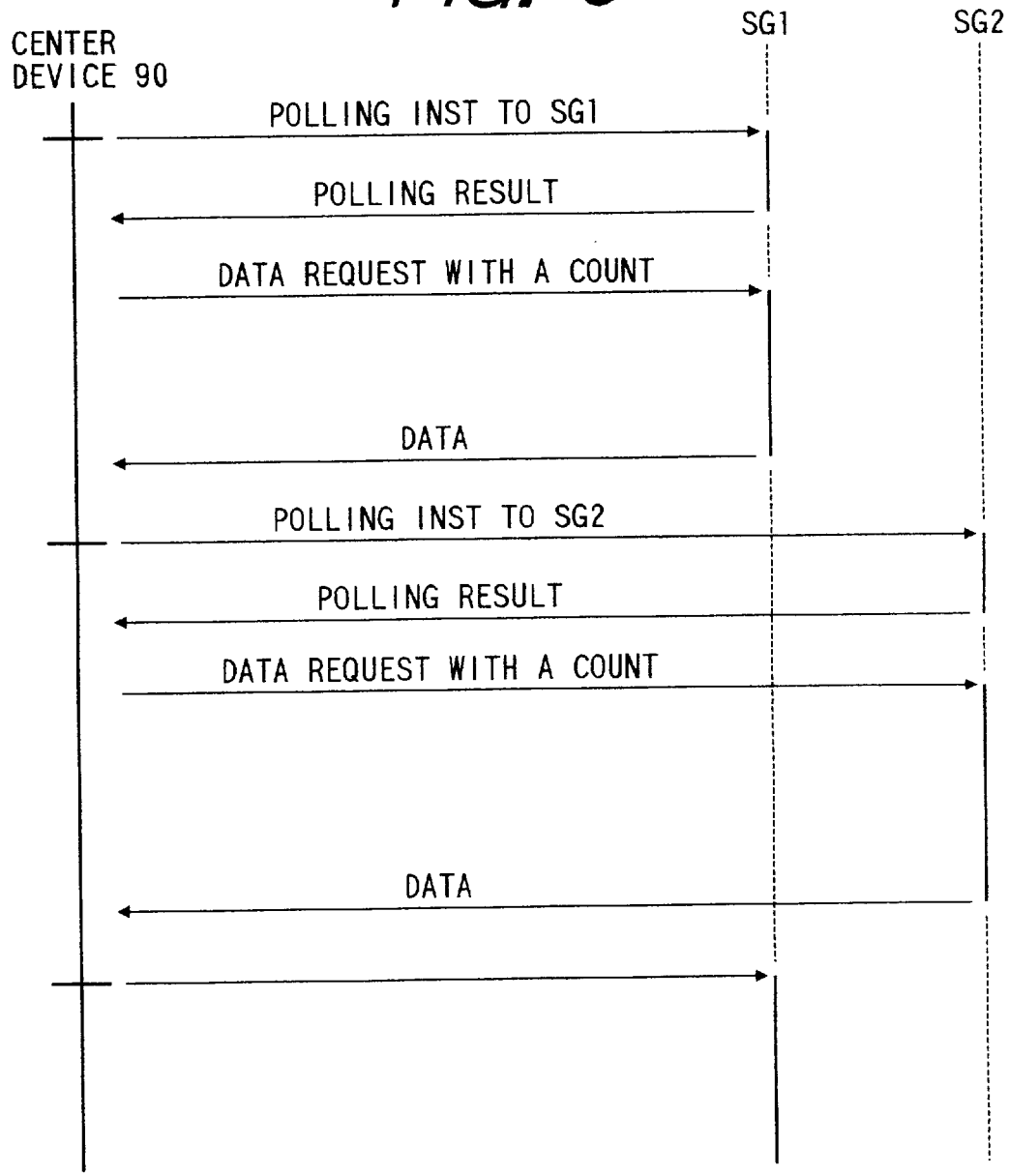

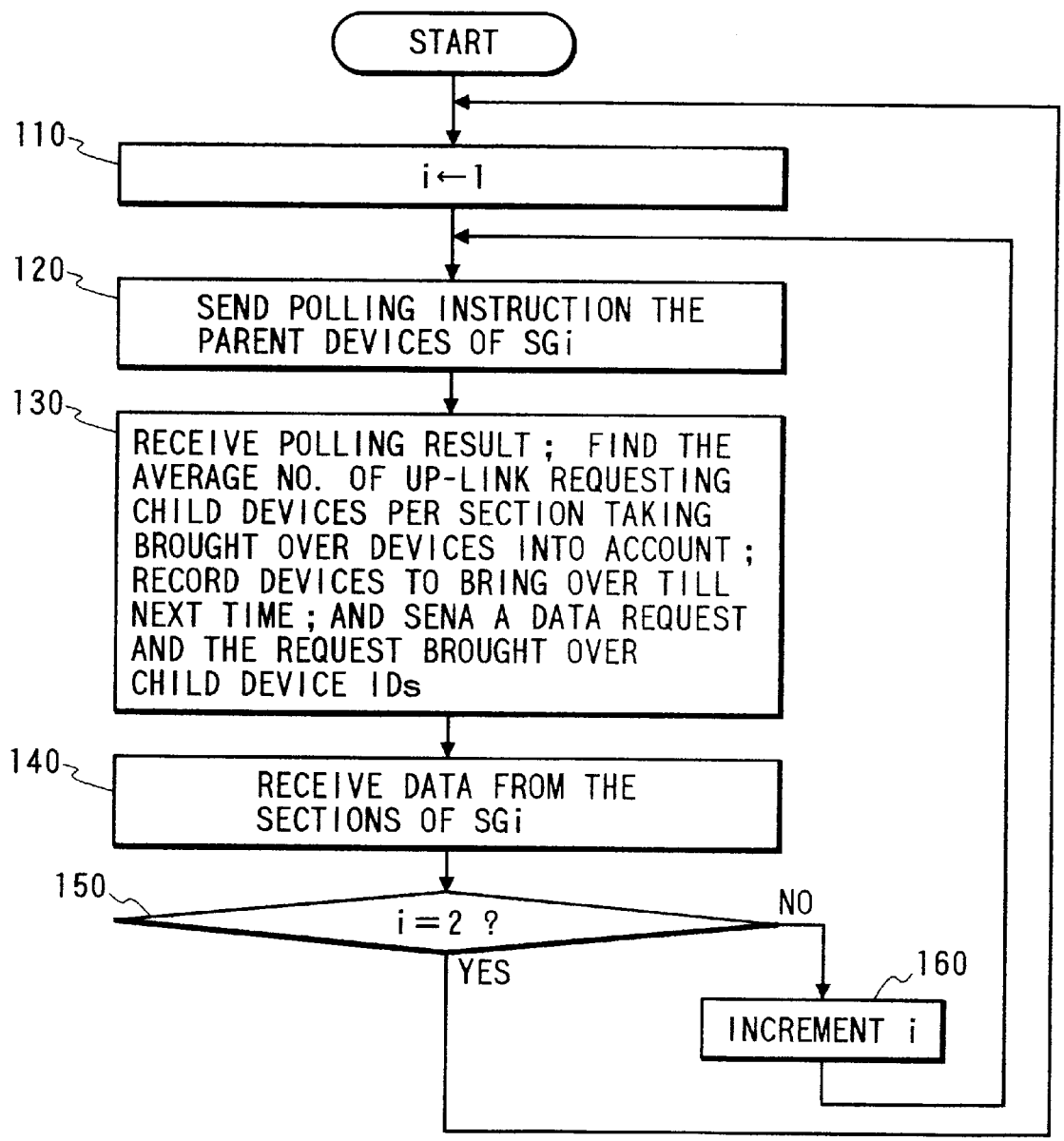

OPTICAL WIRELESS COMMUNICATION SYSTEM

BACKGROUND OF THE INVENTION

1. Field of the Invention

The present invention relates to an optical wireless communication system in which a central device controls a plurality of parent devices and each of the parent devices communicate with a plurality of child devices in one of the sections into which the whole communication area is divided.

2. Description of the Prior Art

This kind of optical wireless communication systems requires separation of communications among the sections in the communication area. That is, a communication between a parent device and each of the child devices in each section has to be achieved without interfering any devices in other (or adjacent) sections or being interfered by any devices in other (or adjacent) sections.

For this purpose, there may be devised some measures in which screens are provided at the boundaries between sections so as to prevent a communication light in each section from leaking into adjacent sections, or spaces are left between sections so as to cause a communication light in each section not to reach adjacent sections. However, these measures would spoil an advantage or setting-up easiness of optical wireless communication systems.

For this reason, different radio carriers (frequencies) are allocated to adjacent sections in the communication area in order to separate adjacent sections from each other. In this case, each of both the parent devices and the child devices requires a filters for extracting a radio carrier allocated thereto. The filter has to be such as has a selectivity of more that a certain level because signals from other sections that have not been filtered off by the filter would interfere with a communication within the section. However, such filters as have high selectivity are expensive causing the cost of the while system to be high.

Therefore, it is an object of the invention to provide an optical wireless communication system and method which permits sure separation of communications among the sections in the communication area.

SUMMARY OF THE INVENTION

According to the present invention, interference between adjacent sections is prevented in an optical wireless communication system, in which a center device is capable of concurrently communicating through lines with a plurality of parent devices each disposed in one of the sections into which a communication area of the system is divided and each of the parent devices communicates with a plurality of child devices disposed in the same section where said parent device is disposed. In a first period of a communication cycle, the center device permits each of the parent devices belonging to a first group of sections which do not adjoin each other to communicate with child devices disposed in the same section where each of the parent devices belonging to the first group is disposed. In a next period of the communication cycle, the center device permits each of the parent devices belonging to the next group of sections which do not adjoin each other and are different from those of the first group to communicate with the child devices disposed in the same section where each of parent devices belonging to the next group is disposed, and repeats this step in the following periods of the communication cycle till all of the parent devices are permitted. The above described procedures are executed in each communication cycle. In each period of a communication cycle, each of permitted parent devices communicates through optical wireless links with child devices disposed in the same section where the permitted parent device is disposed.

The sections may be grouped into some groups of sections which do not adjoin each other and the groups of sections may be registered in the center device in advance. In this case, a communication permission is given to the sections by the group.

BRIEF DESCRIPTION OF THE DRAWINGS

Further objects and advantages of the present invention will be apparent from the following description of the preferred embodiments of the invention as illustrated in the accompanying drawings. In the drawings:

FIG. 4 is a diagram showing data flows between the center device 10 and parent devices 30 of SG1 and SG2 and changes in the states of the center device 10, the SG1 parent devices 30-1 and 30-3, and the SG2 parent devices 30-2 and 30-4;

FIG. 9 is a diagram showing data flows between the center device 10 and parent devices 30 of SG1 and SG2 and changes in the states of the center device 10 and the SG1 and SG2 parent devices according to a second illustrative embodiment of the invention; and FIG. 10 is a flow chart showing an operation of the center device according to the second embodiment.

DETAILED DESCRIPTION OF THE PREFERRED EMBODIMENTS

Embodiment I

Figure 1:
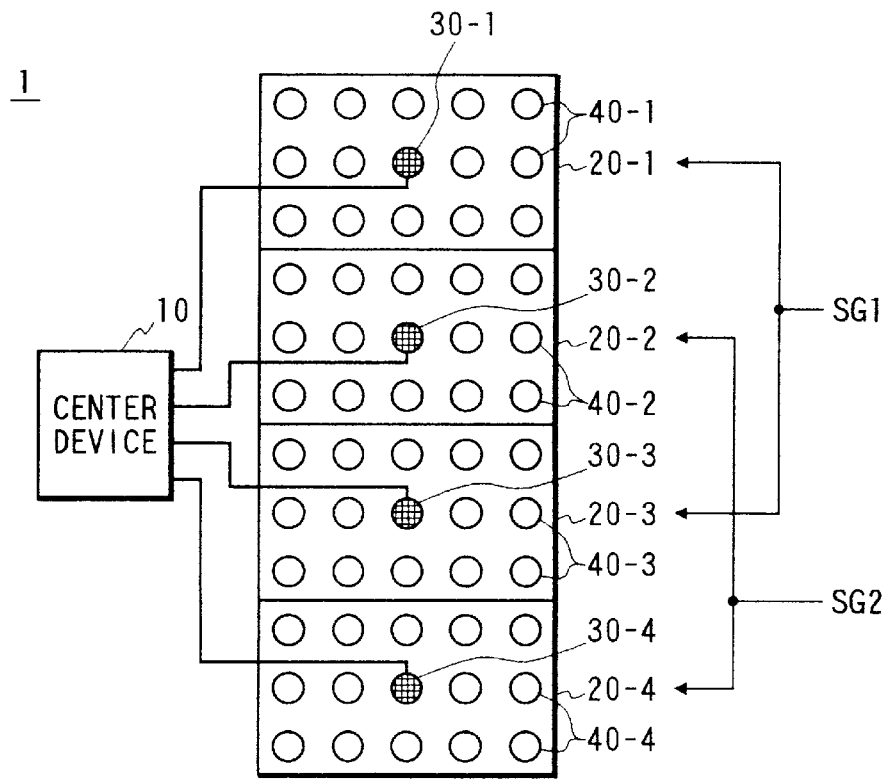
FIG. 1 is a schematic diagram of an arrangement of an illustrative embodiment of an optical wireless communication system according to the principles of the invention.

FIG. 1 is a schematic diagram of an arrangement of an illustrative embodiment of an optical wireless communication system 1 according to the principles of the invention. In FIG. 1, a communication area 20 of the communication system 1 is divided into a plurality of (M, e.g., 4) sections 20-1, through 20-4 (hereinafter, referred en bloc to as "sections 20"). The optical wireless communication system 1 comprises the sections 20 and a center device 10 for controlling the communications in the communication area 20 and processing data gathered through the communications. Each section 20-i (i=1, 2, 3, 4 in this example) comprises a parent device 30-i connected to the center device 10 through an optical fiber or copper wire, and a plurality of child devices 40-i/1 through 40-i/N (hereinafter, referred en bloc to as the child devices 40-i, where N is the number of child devices in the i-th section).

Figure 2:
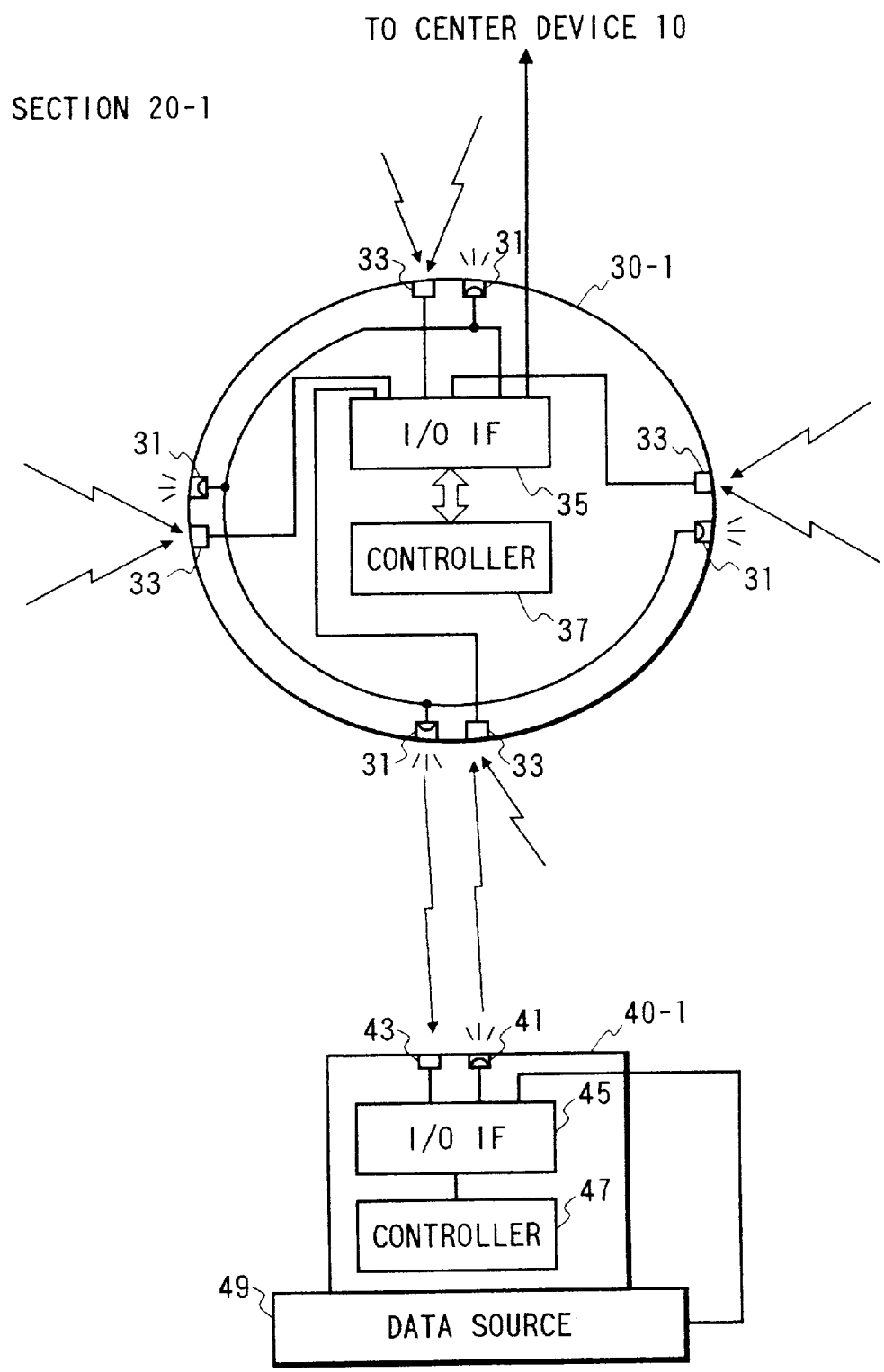
FIG. 2 is a diagram showing exemplary arrangements of the parent device 30-1 and the child device 40-1 of FIG. 1.

FIG. 2 is a diagram showing exemplary arrangements of the center device 10, a parent device 30-1 and a child device 40-1. As shown in FIG. 2, each of the child devices 40-$i$ are connected to a data source 49—for example, a vending machine or various kinds of office automation device such as a computer terminal disposed in a room.

In each communication section 20-$i$, an optical wireless communication is performed between the parent device 30-$i$ and each of the child devices 40-$i$.

Figure 3:
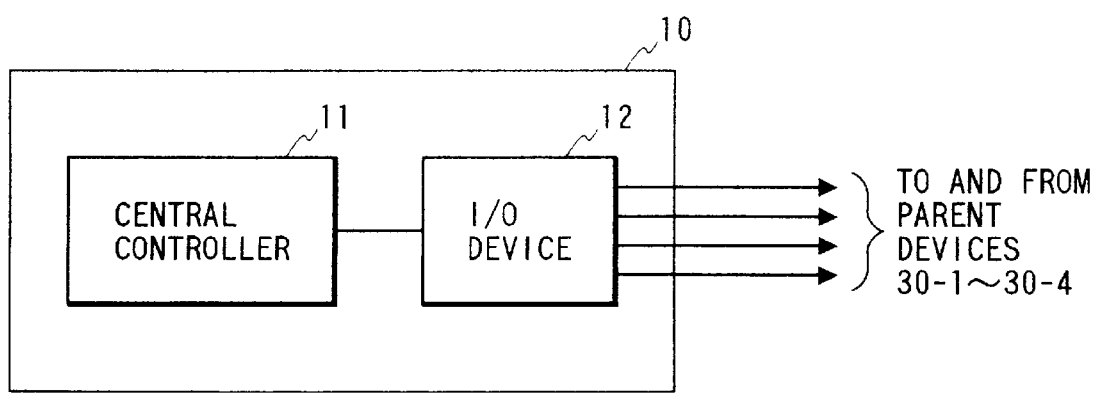
FIG. 3 is a diagram showing an exemplary arrangement of the center device 10 of FIG. 1.

The center device 10 is capable of concurrently communicating with the parent devices 30-1 through 30-4 (hereinafter, referred to as "the parent devices 30") via the optical fibers or copper wires. FIG. 3 shows an exemplary arrangement of the center device 10 of FIG. 1. In FIG. 3, the center device 10 comprises input/output (I/O) devices 12 for the communication with the parent devices 30 and a central controller 11 connected with the I/O devices for controlling the communications between the parent devices 30-1 through 30-4 and the child devices 40-1 through 40-4 belonging to respective sections 20-1 trough 20-4.

A parent device 30-$i$ comprises a plurality of light emitting elements 31 and light receiving elements 33 disposed on the side wall thereof, a controller 37 for controlling communications with the child devices 40-$i$ and with the center device 10, and an I/0 interface (I/O IF) 35 for providing the controller 37 with an output interface to the light emitting elements 31, an input interface from each of the light receiving elements 33 and an I/O interface to and from the center device 10. The light emitting and receiving elements 31 and 33 are disposed along a circumference of a parent device 30-$i$ so as to communicate with the child devices 40-$i$ disposed around the parent device 30-$i$.

Further, the optical wireless communication system 1 uses the same radio carrier for the communication from a parent device 30-$i$ to each child device 40-$i/j$ and for the communication from each child device 40-$i/j$ to the parent device 30-$i$ in each section because the separation of communications among the sections in the communication area is guaranteed as detailed later, where a child device i/j is a j-th child device in a section 20-$i$.

Basic Concept of the Invention

According to the present invention, the separation of communications among the sections in the communication area is guaranteed by controlling the communications between the parent devices 30 and the child devices 40 so as to prevent any optical wireless communications from occurring in adjacent sections at the same time.

For the purpose of this, the sections 20-1 through 20-M (20-4 in this case) of the communication area are first classified into a plurality of section groups so that any of the section groups contains adjacent sections. In this case, the sections 20-1 through 20-4 can be classified into two section groups SG1 and SG2 by grouping as follows:

SG1 consists of sections 20-1 and 20-3, and
SG2 consists of sections 20-2 and 20-4.

As is apparent from this example, if the sections are arranged in a line, the sections can be classified into two section groups SG1 and SG2, where SG1=(sections 20-$i_o$:$i_o$=1, 3, 5 . . . ) and SG2=(sections 20-$i_e$:$i_e$=2, 4, 6 . . . ). Then, any two sections of the section group SG1 never adjoin each other, nor do any two sections of the section group SG2.

Then, the section groups SG1 and SG2 are alternately permitted to carry out optical wireless communications. Specifically, while optical wireless communications are carried out in the section group SG1, that is, sections 20-1 and 20-3, communications are prohibited in the section group SG2, that is, sections 20-2 and 20-4, and vice versa.

By doing this, there come to exist sections where optical wireless communications are suspended between sections where optical wireless communications are carried out, which has the same effect as in case when spaces are left between the communication sections and accordingly ensures the separation of communications among the sections in the communication area.

Figure 5:
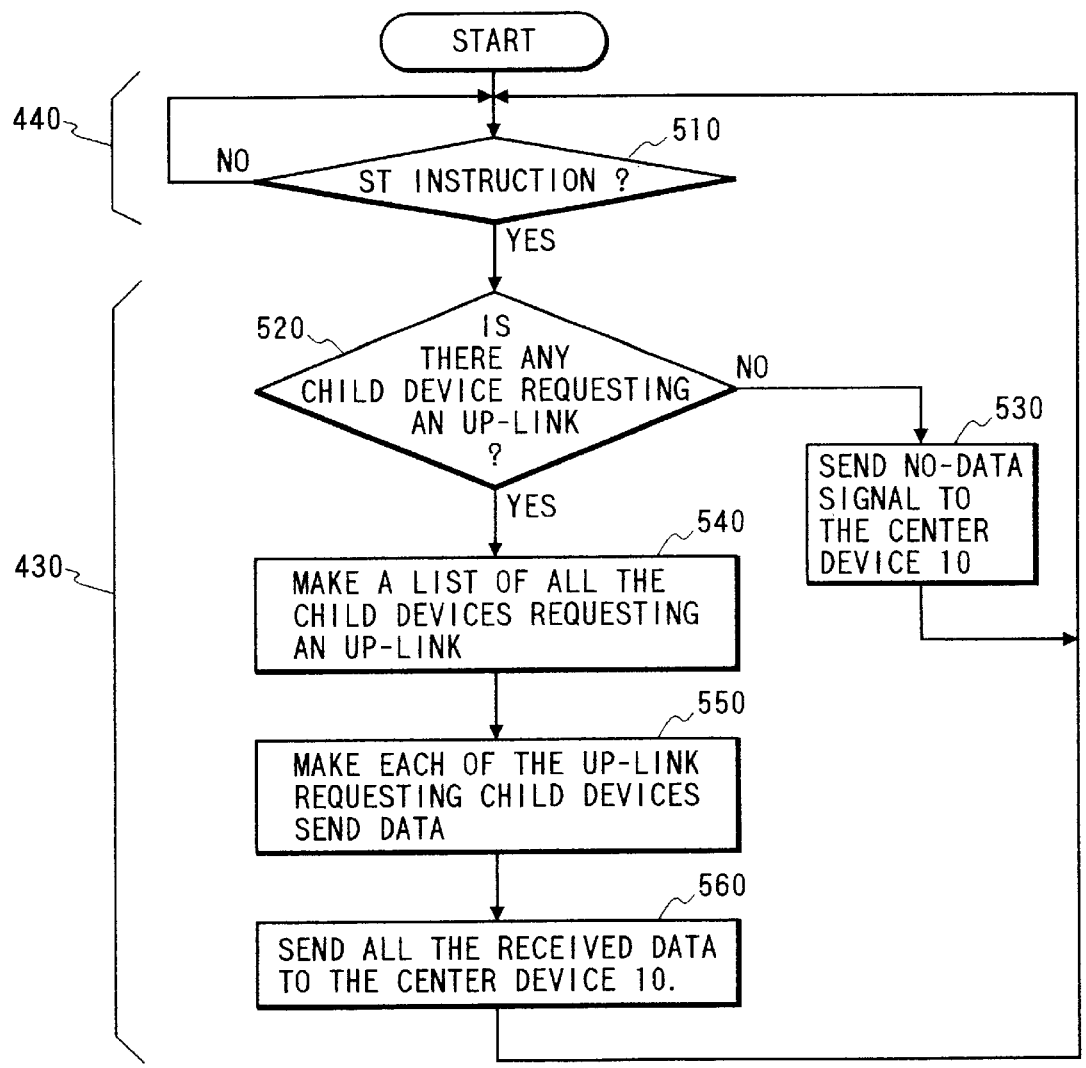
FIG. 5 is a flow chart showing an operation of each parent devices 30-i according to the embodiment of FIG. 1.

Referring to FIGS. 4 and 5, operation of the present embodiment will be described. FIG. 4 is a diagram showing information flows between the center device 10 and parent devices 30 of SG1 and SG2 and changes in the states of the center device 10, the SG1 parent devices 30-1 and 30-3, and the SG2 parent devices 30-2 and 30-4. FIG. 5 is a flow chart showing an operation of each parent devices 30-$i$ according to the embodiment of FIG. 1. The center device 10 sends a start (ST) instruction to each of the parent devices in section group SG1 and to each of the parent devices in section group SG2 alternately as shown in FIG. 4.

If the center device 10 sends an ST instruction to each of the parent devices of SG1, 30-1 and 30-3 (at T1), then the device 10 enters a data wait state 410 for SG1.

In FIG. 5, on receiving the ST instruction in step 510, each of the parent devices 30-1 and 30-3 (or a parent device 30-$i_o$) inters an operation state 430 from an idle state 440 to proceed the step 520, where the parent device 30-$i_o$ inquires of each 40-$i_o/j$ of the child devices in the section $i_o$ to see if the child device 40-$i_o/j$ has a request for a up-link (that is, has data to send). If none of the child devices has the request, the parent device 30-$i_o$ sends a no-data signal (e.g., data containing a flag indicative of absence of data to send) to the center device 10 in step 530 and returns to step 510. Otherwise, the parent device 30-$i_o$ makes a list of the up-link requesting child device IDs (identifiers) in the section 20-$i$ in step 540. Then, the parent device 30-$i_o$, in step 550, send a data request to a first up-link requesting child device in the list; receives data from the first up-link requesting child device; makes a test to see if all the up-link requesting child devices in the list have sent data; if not, repeats the just mentioned processes for the next up-link requesting child device in the list and, otherwise, proceeds to the next step. In step 560, the parent device 30-$i_o$ sends all the received data to the center device 10 and returns to step 510, that is, enters an idle state 440 again.

If the center device 10 receives data from the parent device 30-$i_o$, then the device 10 processes by itself or sends the received data to an external device (not shown) for subsequent processing. Then, the center device 10 sends an ST instruction to each of the parent devices of SG2, that is, parent devices 30-2 and 30-4 (at time T2) to enter a data wait state 410 for SG2. Subsequently, the operation of the just above paragraph is executed by each of the parent devices 30-2 and 30-4 (or a parent device 30-$i_e$).

If the center device 10 receives data from the parent device 30-$i_e$, then the center devie 10 processes by itself or sends the received data to an external device (not shown) for subsequent processing. Thereafter, the center device 10 repeats the above described operation again and again till the system operation is terminated from the outside of the optical wireless communication system 1.

Geometry

Though we have divided the communication area into 4 sections in the above embodiment, the communication area 20 may be divided into any number of sections. It is also noted that though the sections are classified into two section groups in the above embodiment, the sections may be classified into more than two section groups. If the communication are 20 is divided into 6 sections 30-1 through 30-6 for example, then the 6 sections 30 may be classified into three section groups SG1, SG2 and SG3 so that SG1

Figure 6:
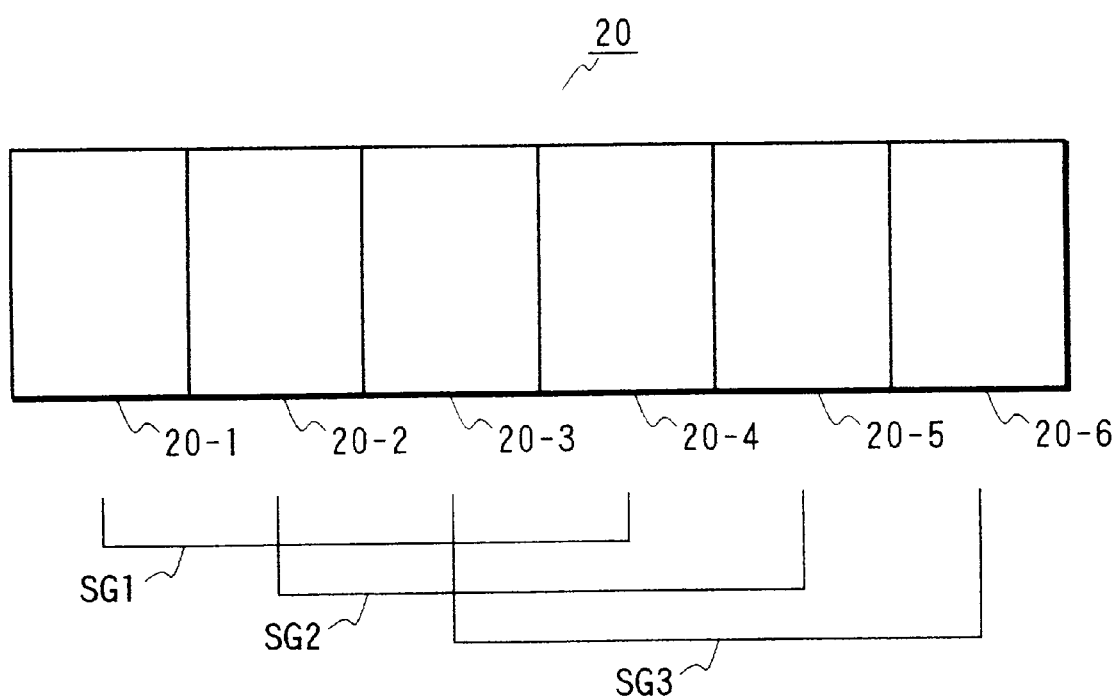
FIG. 6 is an exemplary arrangement of a communication area in which the communication area is divided into 6 sections and the 6 sections are grouped into 3 section groups.

=sections 20-1 and 20-4, SG2=sections 20-2 and 20-5, and SG3=sections 20-3 and 20-6 as shown in FIG. 6.

The communication time which it takes for the center device 10 to collect data from a section 20-$i$ is proportional to the number N of child devices 40-$i$ in the section 20-$i$. The number N of child devices 40-$i$ can be reduced to make the communication time short by dividing the communication area into a larger number of sections. However, too large number of sections will cause the area of each section to become too small to serve as a space between sections. For this reason, it is preferable to adjust the number N of child devices 40-$i$ in each section 20-$i$ on the basis of an allowable maximum distance between a parent device 30-$i$ and a child device $i/j$.

It is also noted that if the time that it takes for each child device to send data to its parent device is constant, then the communication efficiency between the parent device and the child devices in each section can be raised by providing each child device with a timer; the parent device sending an inquiry for IDs of up-link desiring child devices with a global address for all the child devices; the candidate child devices sending their IDs to the parent device; the parent device sending a packet containing the IDs in the communication order; and the candidate child devices voluntarily sending their data in the communication order on the basis of the count of the above timer.

Though the segment groups have been fixed throughout the operation of the optical wireless communication system 1 in the above embodiment, the grouping of the segments may be changed according to the distribution of the up-link requesting child devices 40-$i/j$ in a communication cycle for the sections in the whole communication area.

In order to determine the section groups according to the distribution of the up-link requesting child devices 40-$i/j$ in a communication cycle, the center device has first to cause the parent devices 30-1 through 30-M to inquire of respective child devices 40-1 through 40-M to see how many up-link requesting child devices each parent device 30-$i$ has.

Modification

Figure 7:
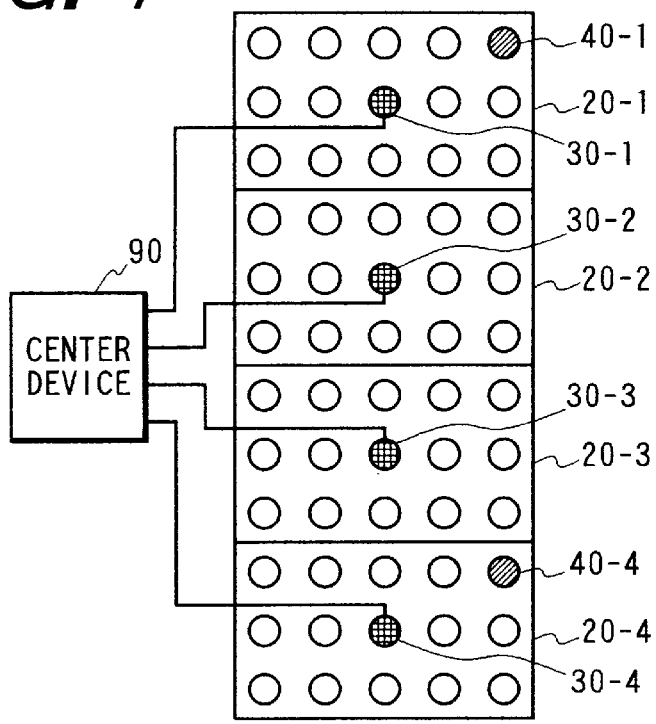
FIGS. 7 and 8 are diagram showing examples of the distribution of up-link requesting child devices in a certain communication period.

Here, we discuss a optical wireless communication system in which the communication area is divided into 4 sect ions and the child devices are connected with data sources in which data occurs less frequently. Assume that the center device 10 have found, from the inquiries by the parent devices, that there are up-link requesting child devices only in sections 20-1 and 20-4 as shown in FIG. 7. Then, since sections 20-1 and 20-4 do not adjoin each other, the center device 10 may cause the parent devices 30-1 and 30-4 to collect data from the up-link requesting child devices by means of optical wireless communication.

Embodiment II

Figure 8:
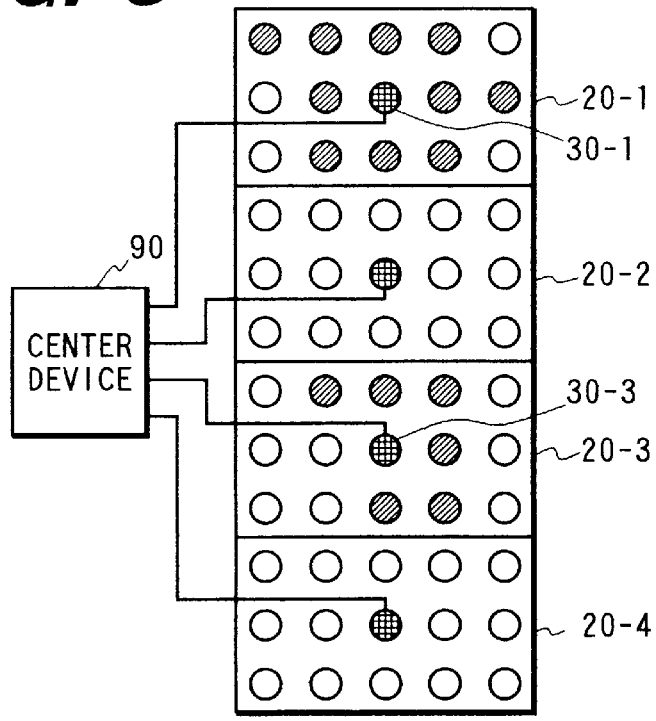

Assume that there are 10 and 6 up-link requesting child devices in sections 20-1 and 20-3 as shown in FIG. 8. As described above, communications are simultaneously executed in section 20-1 and 20-3 in this case. Though 6 child devices take part in communications in each of the sections 20-1 and 20-3, the parent and child devices are idle in section 20-3 while the remaining 4 child devices are used alone for communications in section 20-1.

Assuming that the probability of occurrence of up-link requests is identical for all the sections 20-1 through 20-4, it can be thought that if a larger number of child devices of a certain section 20-$i$ has requested up-links in a communication period, then there will be a smaller number of up-link requesting child devices in the section 20-$i$ in the next communication period. Therefore, the following embodiment is possible.

FIG. 9 is a diagram showing data flows between the center device 90 and parent devices 30 of SG1 and SG2 and changes in the states of the center device 90 and the SG1 and SG2 parent devices according to a second illustrative embodiment of the invention. FIG. 10 is a flow chart showing an operation of the center device according to the second embodiment. For the purpose of the simplicity, it is assumed that the geometrical arrangement of the embodiment is the same as that shown in FIG. 1.

The center device 90 starts operation for section group SG1 in step 110 and send polling instructions to the parent devices of SG1. In response to the polling instructions, the SG1 parent devices poll respective child devices to collect up-link requests, adds up-link requesting child device IDs to an requesting ID list, and reports the up-link requesting child device IDs to the center device 90. In step 130, the center device 90 receives the up-link requests from the parent devices; calculate the average number of requests per section including the up-link requests which have been brought over from the previous communication period; if the number of requests for a section 20-$i$ exceeds the calculated average number, the excess up-link requests or request brought over child device IDs are recorded for the section 20-$i$; and send a data request and the request brought over child device IDs to the SG1 parent devices. In response to a data request, each of the SG1 parent devices causes the child devices in the requesting ID list to return data if the data request is accompanied by no ID and, if the data request is accompanied by any IDs, causes child devices in the requesting ID list other than child devices identified by the (request brought over child device) IDs to return data. Then, the center device 90 collects data from the SG1 parent devices in step 140. The above described operations are repeated for SG2 through steps 150 and 160. Thereafter, the above operations are repeatedly executed through steps 150 and 110.

Assume that 10 child devices of section 20-1 and 6 child devices of section 20-3 are requesting up-links in a first communication period for SG1, and that 4 and 8 child devices of sections 20-1 and 20-3 are requesting up-links in the second communication period for SG1. Then, since the average number of requests is 8 in the first period, data is collected from 8 child devices in section 20-1 in the first period and up-link requests for the 2 remaining child devices is brought over till the second communication. In the second period, the average number of up-link requests are calculated in the following way:

$$\{(4+2)+8\}/2=7.$$

Thus, data is collected from 6 child devices of section 20-1 and from 7 child devices of section 20-3 in the second communication period, and one request of the one remaining child device of section 20-3 is brought over till the next communication period.

Doing this permits data to be collected from 27 child devices for the time period which it takes to collect data from 15 child devices, which permits an enhancement of the throughput of the optical wireless communication system.

A traffic concentration may continue in which a specific section, e.g., 20-1 contains many up-link requesting child devices, while other sections have few up-link requesting child devices. In such a case, some of the child devices in the section 20-1 may not be able to send data regardless of repeated up-link requests. In order to cope with this situation, an up-link request count which indicates the number of up-link requests the child device has made so far may be included in status data for the child device. In this case, the parent device is so adapted that the parent device gives more priority to a child device with a larger up-link request count. Also, the center device is so adapted that if the number of child devices with a up-link request count exceeding a threshold value reaches a predetermined number in a section 20-$i$, then the center device increases communication periods for the section 20-$i$ by reducing communication periods for other sections.

By doing this, a maximum delay time involved in information transmission can be guaranteed. Information which first occurred can be transmitted first.

Data can be effectively processed even in case of a traffic concentration by expressing special priorities such as the highest priority, the lowest priority, etc. by using such values as are never used as status data—0 and 99 for example.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for preventing interference between adjacent sections in an optical wireless communication system wherein a center device communicates concurrently through lines with a plurality of parent devices each disposed in one of the sections, each of said parent devices communicating with a plurality of child devices disposed in the same section as that of the parent device the method comprising the steps of:

in a first period of a first communication cycle, said center device permitting each of said parent devices belonging to a first group of sections which do not adjoin each other to communicate with child devices disposed in the same section where each of parent devices belonging to said first group is disposed;

in a second period of said first communication cycle, said center device permitting each of said parent devices belonging to a second group of sections which do not adjoin each other and are different from those of said first group to communicate with child devices disposed in the same section in which each of parent devices belonging to said second group is disposed;

said center device executing all of said steps in each communication cycle in numerical sequence starting from said first period of said first communication cycle wherein;

in each period of each communication cycle, each parent device communicates through optical wireless links with child devices disposed in the same section where said parent device is disposed and wherein the operation of the center device to permit each parent device to communicate with the child devices in the same section thereof comprises the steps of collecting up-link requesting child device IDs from said each of said sections through a parent device disposed in each of the sections; and on the basis of said up-link requesting child device IDs from said each of said sections and IDs of child devices whose up-link request have been brought over from a previous communication cycle, limiting the number of up-links in said each of said sections to an average up-link number per section and bringing over limited up-links to the next communication cycle.

2. A method as defined in claim 1, further comprising the step of grouping sections into registered groups of sections in said center device in advance, and wherein the collection of up-links requesting child device is collected from each of said sections according to said registered groups of sections.

3. A method as defined in claim 2, wherein of said center device further comprises the steps of:

collecting up-link requesting child device IDs from each of said sections through a parent device disposed in said each of said sections; and on the basis of said up-link requesting child device IDs from said each of said sections and IDs of child devices whose up-link request have been brought over from a previous communication cycle, limiting the number of up-links in said each of said sections to an average up-link number per section and bringing over limited up-links till next communication cycle.

4. A method as defined in claim 2, wherein the operation of said center device further comprises the steps of:

sending a polling instruction to said each of parent devices;

receiving up-link requesting child device IDs from said each of said parent devices;

calculating an average number of up-link requesting child devices per section from said up-link requesting child device IDs from said each of said parent devices and IDs of child devices whose up-link request have been brought over from a previous communication cycle;

storing IDs of child devices whose up-link requests are to bring over till next communication cycle if the number of up-link requests in any of said sections (from any of said parent devices) is larger than said average number;

sending a data request instruction, said average number and said stored IDs, if any, to said each of said parent devices; and receiving data from said each of said parent devices.

5. A method as defined in claim 1, wherein each parent device makes an inquiry of said child devices disposed in the same section where said permitted parent device is disposed to see if said child device requests an up-link; and wherein said parent devices polls only up-link requests of said child devices requesting an up-link for data.

6. A method as defined in claim 1, wherein the operation of of said center device further comprises the steps of:

sending a polling instruction to said each of parent devices;

receiving up-link requesting child device IDs from said each of said parent devices;

calculating an average number of up-link requesting child devices per section from said up-link requesting child device IDs from said each of said parent devices and IDs of child devices whose up-link request have been brought over from a previous communication cycle;

storing IDs of child devices whose up-link requests are to bring over till next communication cycle if the number of up-link requests in any of said sections (from any of said parent devices) is larger than said average number;

sending a data request instruction, said average number and said stored IDs, if any, to said each of said parent devices; and receiving data from said each of said parent devices.

7. A method as defined in claim 1, wherein the operation of of said center device further comprises the steps of:

collecting up-link requesting child device IDs from each of said sections through a parent device disposed in said each of said sections;

in response to each of said up-link requesting child device IDs, incrementing a count associated with said child device ID; and selecting said group of sections according to said counts for all of said sections.

8. An optical wireless communication system free from interference between adjacent sections wherein a communication area is divided into a plurality sections, comprising:

a center device;

plurality of parent devices each disposed in one of said sections, said center device communicating concurrently with said parent devices through conductive lines; and a plurality of child devices disposed in each of said sections, with each of said parent devices communicating with said plurality of child devices disposed in the same section as said parent device is disposed, wherein said center device comprises;

means operative in a hist period of a first communication cycle for permitting each of said parent devices belonging to a first group of sections which do not adjoin each other to communicate with child devices disposed in the same section to which each parent devices of said first group is disposed;

means operative in a second period of said first communication cycle for permitting each of said parent devices belonging to a second group of sections which do not adjoin each other and are different from those of said first group of sections, to communicate with child devices disposed in the same section to which each of the parent devices of said second group are disposed;

means for executing all of said steps in said first communication cycle in numerical sequence and symmetrically advancing to subsequent communication cycles in which each period is reexecuted, in sequence with each of said plurality of parent devices comprising:

means, for communicating through optical wireless links with child devices disposed in the same section in which said parent device is disposed and wherein said system includes a center device connected to each parent device for controlling the communication of each parent device to each child device in the same section as the parent device, said center device comprising:

means for collecting up-link requesting child device IDs from each of said sections through a parent device disposed in said each of said sections; and means, operative on the basis of said up-link requesting child device IDs from said each of said sections and IDs of child devices whose up-link request have been brought over from a previous communication cycle, for limiting the number of up-links in said each of said sections to an average up-link number per section and bringing over limited up-links to the next communication cycle.

9. A system as defined in claim 8, wherein said sections are grouped into groups of sections which do not adjoin each other with said groups of sections registered in said center device in predetermined registered groups of sections.

10. A system as defined in claim 9, further comprising means for sending a polling instruction to said each of parent devices;

means for receiving up-link requesting child device IDs from said each of said parent devices, means for calculating an average number of up-link requesting child devices per section from said up-link requesting child device IDs from said each of said parent devices and IDs of child devices whose up-link request have been brought over from a previous communication cycle;

means for storing IDs of child devices whose up-link requests are to bring over till next communication cycle if the number of up-link requests in any of said sections (from any of said parent devices) is larger than said average number;

means for sending a data request instruction, said average number and said stored IDs, if any, to said each of said parent devices; and means for receiving data from said each of said parent devices.

11. A system as defined in claim 8, further comprising means for inquiring each of said child devices disposed in the same section as said parent device to see if said child device requests an up-link; and means for polling only up-link requests requests from said child device for data.

12. A system as defined in claim 8, further comprising means for sending a polling instruction to said each of parent devices;

means for receiving up-link requesting child device IDs from said each of said parent devices, means for calculating an average number of up-link requesting child devices per section from said up-link requesting child device IDs from said each of said parent devices and IDs of child devices whose up-link request have been brought over from a previous communication cycle;

means for storing IDs of child devices whose up-link requests are to bring over till next communication cycle if the number of up-link requests in any of said sections (from any of said parent devices) is larger than said average number;

means for sending a data request instruction, said average number and said stored IDs, if any, to said each of said parent devices; and means for receiving data from said each of said parent devices.

13. A system as defined in claim 8, further comprising means for collecting up-link requesting child device IDs from each of said sections through a parent device disposed in said each of said sections;

means responsive to each of said up-link requesting child device IDs for incrementing a count associated with said child device ID; and means for selecting said group of sections according to said counts for all of said sections.

* * * * *

UNITED STATES PATENT AND TRADEMARK OFFICE
CERTIFICATE OF CORRECTION

PATENT NO. : 5,959,754
DATED : September 28, 1999
INVENTOR(S): SAKURAI et al

It is certified that error appears in the above-identified patent and that said Letters Patent is hereby corrected as shown below:

Title page, item [30],
Priority: Japanese 8-22005 - January 12, 1996

Signed and Sealed this

Thirtieth Day of May, 2000

Attest:

Q. TODD DICKINSON

*Attesting Officer*  *Director of Patents and Trademarks*